G. FLIEDNER.
Bird-Cage Attachments.
No. 158,695.  Patented Jan. 12, 1875.
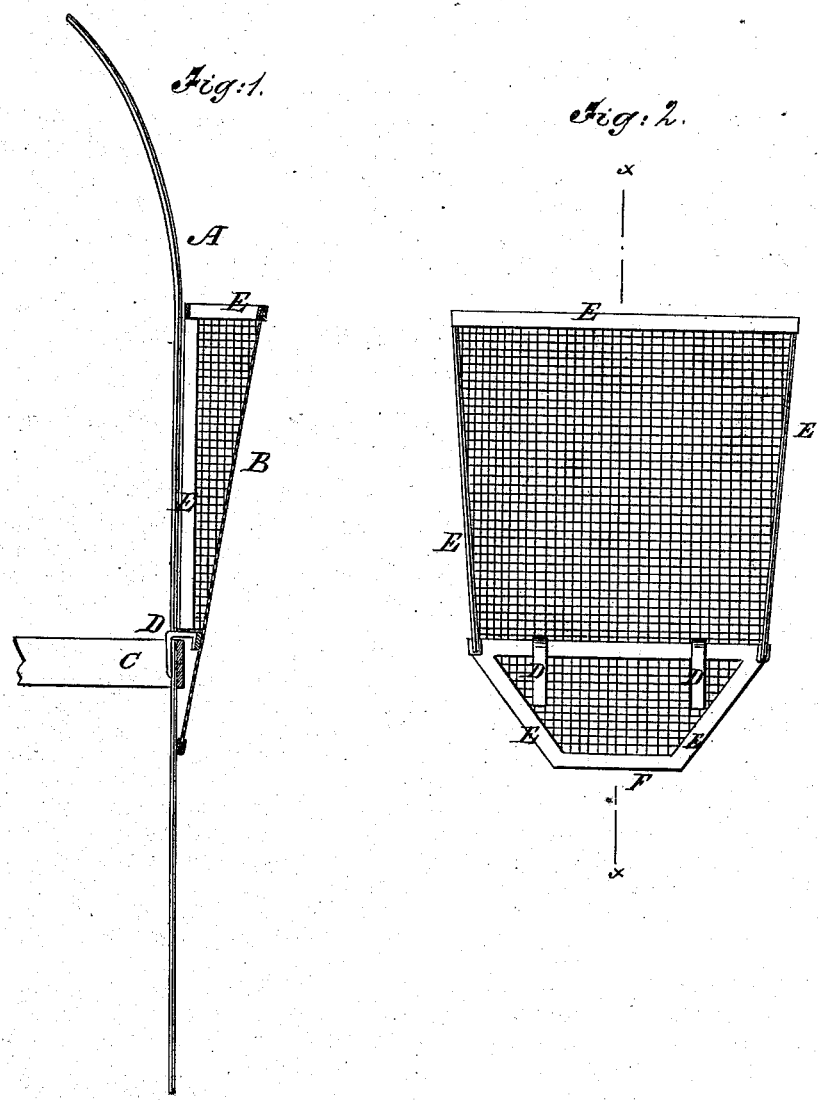

UNITED STATES PATENT OFFICE.

GEORGE FLIEDNER, OF PORTLAND, OREGON.

IMPROVEMENT IN BIRD-CAGE ATTACHMENTS.

Specification forming part of Letters Patent No. 158,695, dated January 12, 1875; application filed October 3, 1874.

*To all whom it may concern:*

Be it known that I, GEORGE FLIEDNER, of Portland, Multnomah county, Oregon, have invented a new and Improved Bird-Cage Attachment, of which the following is a specification:

This invention relates to cages for birds; and it consists of an attachment or crib for cages, for holding pieces of cake, apple, sugar, and the various articles which are usually placed between the wires of cages, and consequently not securely confined.

Figure 1 represents the side of the cage with the attachment confined thereto, the view being a section on line *x x* of Fig. 2; and Fig. 2 is a front view of the attachment.

Similar letters of reference indicate corresponding parts.

A represents the side of the cage. B is the attachment or crib. C is a band on the cage, to which the crib is attached by the hooks D. The crib is made in whole or in part of wire, stayed by strips of tin or other metal E at the top and side edges, and around the bottom piece F, as seen. The crib may be made entirely of sheet metal, or any other material. It is open at the top, so that pieces of cake, apple, sugar, or similar articles may from time to time be dropped in and consumed by the bird, by his picking through the wires of the cage.

From the shape of the crib, it will be seen that the article introduced will lodge and be retained until the bird has consumed it.

The hooks D being the only fastening, the crib is prevented from dropping back by the extended end of the bottom piece E, which bears against the cage. The crib is wedge-shaped edgewise, with its butt or broad end up, and sufficiently broad to receive articles of ordinary size.

Having thus described my invention, I claim as new and desire to secure by Letters Patent—

The receptacle B, constructed of the frame E and wire body, and open at the side adjoining the cage and secured thereto, substantially as described.

GEORGE FLIEDNER.

Witnesses:
G. R. STRUBLE,
D. W. WAKEFIELD.